J. L. THOMPSON.
BAKING RACK.
APPLICATION FILED MAY 15, 1914.

1,159,132.  Patented Nov. 2, 1915.

Witnesses

Inventor
John L. Thompson
By Victor J. Evans
Attorney

UNITED STATES PATENT OFFICE.

JOHN L. THOMPSON, OF EL CENTRO, CALIFORNIA.

BAKING-RACK.

1,159,132.  Specification of Letters Patent.  Patented Nov. 2, 1915.

Application filed May 15, 1914. Serial No. 838,872.

*To all whom it may concern:*

Be it known that I, JOHN L. THOMPSON, a citizen of the United States, residing at El Centro, in the county of Imperial and State of California, have invented new and useful Improvements in Baking-Racks, of which the following is a specification.

This invention is an improved rack for use in an oven for baking and roasting, the object of the invention being to provide an improved rack which is provided with a boiler extending around the same to supply steam to the oven in which the rack is used and thereby causing the meat, bread or other article being baked or roasted to be kept moist and thereby preventing the same from drying out.

The invention consists in the construction, combination and arrangement of devices hereinafter described and claimed.

Figure 1:
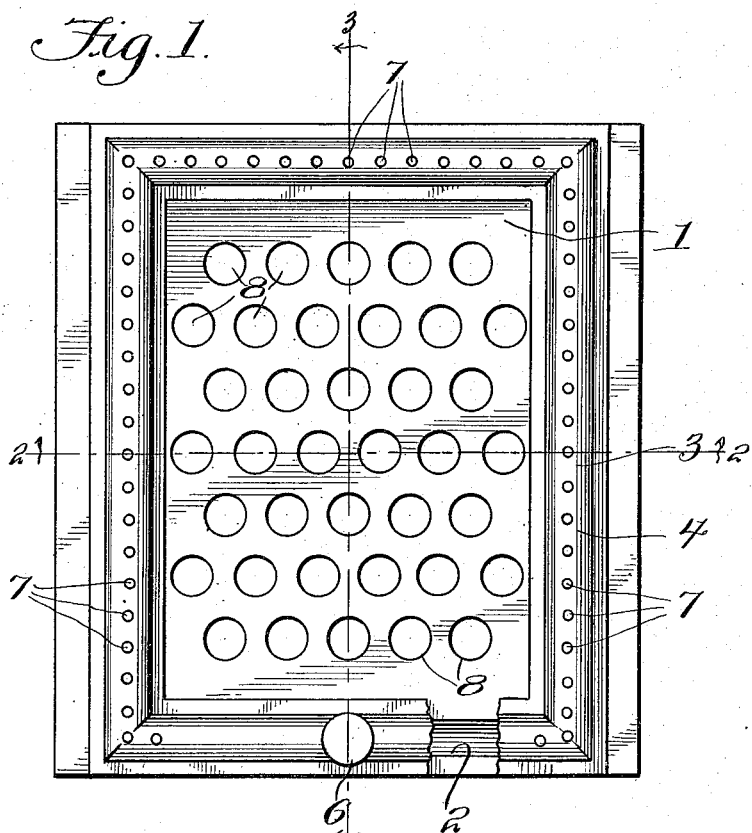
Figure 2:
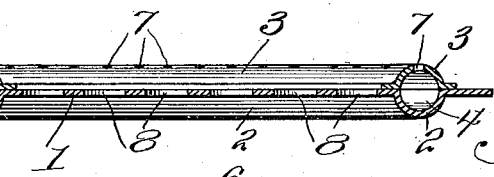
Figure 3:
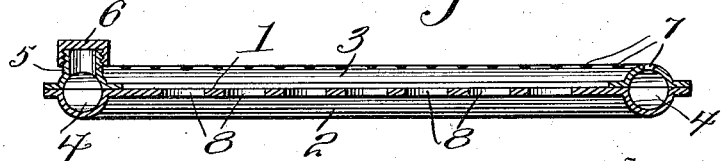

In the accompanying drawings:—Figure 1 is a plan of an improved baking rack constructed in accordance with my invention. Fig. 2 is a vertical transverse sectional view of the same. Fig. 3 is a vertical longitudinal sectional view of the same.

The rack body 1 is here shown as of oblong rectangular form and should be of any size or shape adapting it to be readily placed in and removed from an oven of a stove or range. Preferably my improved rack is made of sheet metal but it may be made of any suitable material. In the embodiment of my invention the body of the rack is formed with a semi-tubular groove 2 which extends around the same and is spaced a suitable distance from the sides and ends of the rack, this semi-tubular groove being formed by a corrugation on the under side of the rack. A semi-tubular member 3 is secured on the rack, above the semi-tubular corrugation 2 and is secured to the rack by welding or in any other suitable manner and the said semi-tubular member 3 coacts with the corrugation 2 to form a boiler 4 which extends around the rack as shown. The front side of the boiler is provided at its center with a filling nipple 5 to enable water to be placed in the boiler and with a cap 6 to close said nipple. The sides and rear portion of the members 3 are provided in their upper sides with small openings 7 for the escape of steam. The body of the rack, within the space bounded by the boiler is formed with openings 8 which enable steam to pass downwardly through the rack so that steam will be supplied to all parts of the oven, both above and below the rack and thereby cause the meat, bread or other article being roasted or baked to be kept moist and prevented from drying out.

When an article is being baked or roasted that should not be moistened water may be omitted from the boiler and hence prevent steam from being supplied to the oven.

My improved baking rack may be readily placed in or removed from an oven, is light, cheap, simple, strong and durable and its use enables food articles to be baked or roasted in a highly superior manner.

Having thus described my invention, I claim:—

1. A baking rack comprising a body having a corrugation extending around the same near its ends and sides and also provided with a semi-tubular member secured in registry with and on the side opposite the corrugation and coacting with the corrugation to form a boiler, the said rack having openings for the passage of steam therethrough.

2. As a new article of manufacture, a baking rack comprising a perforated body having coöperating bulged portions defining a water receiving channel extending about the marginal edges of the rack, and having a filling opening, means closing said opening, and one of said bulged portions having a series of apertures for the purpose specified.

In testimony whereof I affix my signature in presence of two witnesses.

JOHN L. THOMPSON.

Witnesses:
  H. L. BARKER,
  THOMAS MURPHY.

Copies of this patent may be obtained for five cents each, by addressing the "Commissioner of Patents, Washington, D. C."